United States Patent
Xia et al.

(10) Patent No.: US 10,921,476 B2
(45) Date of Patent: Feb. 16, 2021

(54) THERMAL MODULATED VIBRATING SENSING MODULE FOR GAS MOLECULAR WEIGHT DETECTION

(71) Applicant: HALLIBURTON ENERGY SERVICES, INC., Houston, TX (US)

(72) Inventors: Hua Xia, Huffman, TX (US); Christopher Michael Jones, Houston, TX (US); Robert Atkinson, Conroe, TX (US); Tian He, Houston, TX (US); Bin Dai, Spring, TX (US); Jing Shen, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/512,606

(22) Filed: Jul. 16, 2019

(65) Prior Publication Data

US 2019/0339410 A1    Nov. 7, 2019

Related U.S. Application Data

(62) Division of application No. 15/311,246, filed as application No. PCT/US2014/047832 on Jul. 23, 2014, now abandoned.

(51) Int. Cl.
*G01V 1/46* (2006.01)
*G01N 9/00* (2006.01)
(Continued)

(52) U.S. Cl.
CPC .............. *G01V 1/46* (2013.01); *E21B 49/08* (2013.01); *E21B 49/081* (2013.01); *G01N 9/002* (2013.01);
(Continued)

(58) Field of Classification Search
CPC .... G01V 1/46; G01N 9/002; G01N 2291/014; G01N 29/02; E21B 49/08; E21B 49/081; E21B 49/0875
See application file for complete search history.

(56) References Cited

U.S. PATENT DOCUMENTS

| | | | | |
|---|---|---|---|---|
| 2,635,462 A | * | 4/1953 | Poole ..................... | G01N 9/002 73/32 A |
| 3,444,723 A | * | 5/1969 | Wakefield .............. | G01N 9/002 73/32 A |

(Continued)

FOREIGN PATENT DOCUMENTS

| EP | 1306659 B1 | 6/2006 |
|---|---|---|
| EP | 2458377 A1 | 5/2012 |

OTHER PUBLICATIONS

Extended Search Report issued for European Patent Application No. 14897913 dated Dec. 6, 2017, 10 pages.

(Continued)

*Primary Examiner* — John Fitzgerald
(74) *Attorney, Agent, or Firm* — Haynes and Boone, LLP

(57) ABSTRACT

A downhole formation fluid identification sensing module for measuring averaged gas molecular weight of wellbore formation fluid acquires simultaneous temperature, pressure, and density measurements. The sensing module includes two venturi-type gas sensors that both contain vibrating tubes. During operation, formation fluid flows through the vibrating tubes whereby resonant frequency measurements are acquired simultaneously with temperature and pressure measurements. Each measurement is then utilized to determine the gas molecular weight of the dry, wet or saturated formation fluid.

12 Claims, 7 Drawing Sheets

(51) Int. Cl.
*E21B 49/08* (2006.01)
*E21B 47/07* (2012.01)
*E21B 47/06* (2012.01)

(52) U.S. Cl.
CPC ............... *E21B 47/06* (2013.01); *E21B 47/07* (2020.05); *E21B 49/0875* (2020.05); *G01N 2009/004* (2013.01); *G01N 2009/006* (2013.01)

(56) References Cited

U.S. PATENT DOCUMENTS

| | | | |
|---|---|---|---|
| 3,672,388 A | 6/1972 | Ringwall et al. | |
| 3,874,221 A * | 4/1975 | Lockie | G01N 9/002 73/24.05 |
| 3,955,401 A * | 5/1976 | Catherall | G01N 9/002 73/32 A |
| 4,262,523 A * | 4/1981 | Stansfeld | G01N 9/002 73/24.05 |
| 4,491,009 A * | 1/1985 | Ruesch | G01N 9/002 73/32 A |
| 4,527,417 A * | 7/1985 | Pravda | G01N 33/0027 374/45 |
| 4,622,858 A * | 11/1986 | Mizerak | G01F 1/8413 73/861.357 |
| 4,655,075 A * | 4/1987 | Albert | G01N 9/002 73/32 A |
| 4,680,974 A * | 7/1987 | Simonsen | G01F 1/8431 73/861.357 |
| 4,768,384 A * | 9/1988 | Flecken | G01F 1/8495 73/861.02 |
| 4,803,867 A * | 2/1989 | Dahlin | G01F 1/8413 73/32 A |
| 5,048,349 A * | 9/1991 | Wolff | G01F 1/8468 73/861.357 |
| 5,226,330 A * | 7/1993 | Lew | G01F 1/8409 73/861.357 |
| 5,386,732 A | 2/1995 | Scotto | |
| 5,497,665 A * | 3/1996 | Cage | G01F 1/8409 73/861.356 |
| 5,576,500 A * | 11/1996 | Cage | G01F 1/8409 73/861.355 |
| 5,850,039 A * | 12/1998 | Van Cleve | G01F 1/8409 73/861.357 |
| 6,378,364 B1 * | 4/2002 | Pelletier | G01F 1/8436 73/152.47 |
| 6,502,466 B1 * | 1/2003 | Cage | G01F 1/8436 73/861.355 |
| 6,912,904 B2 * | 7/2005 | Storm, Jr. | G01F 1/8436 73/579 |
| 6,925,392 B2 | 8/2005 | McNeil, III et al. | |
| 7,217,367 B2 | 5/2007 | Huang et al. | |
| 7,549,319 B2 * | 6/2009 | Headrick | G01N 9/002 73/32 A |
| 7,654,130 B2 | 2/2010 | Shah et al. | |
| 7,959,865 B2 | 6/2011 | Schmidt et al. | |
| 8,269,961 B2 | 9/2012 | Mostowfi et al. | |
| 8,380,446 B2 | 2/2013 | Mostowfi et al. | |
| 8,414,832 B1 | 4/2013 | Roques et al. | |
| 9,228,433 B2 * | 1/2016 | Sawyer | E21B 49/005 |
| 9,459,191 B2 * | 10/2016 | Downie | G01N 29/036 |
| 10,012,077 B2 * | 7/2018 | Xia | E21B 47/07 |
| 10,458,233 B2 * | 10/2019 | Xia | G01N 35/1097 |
| 2002/0178803 A1 | 12/2002 | Pelletier et al. | |
| 2004/0123645 A1 * | 7/2004 | Storm, Jr. | G01F 1/8495 73/32 A |
| 2005/0246151 A1 | 11/2005 | Difoggio | |
| 2005/0273278 A1 * | 12/2005 | Sprague | G01F 1/3272 702/45 |
| 2008/0115577 A1 | 5/2008 | Headrick | |
| 2009/0193889 A1 | 8/2009 | Waid et al. | |
| 2010/0268469 A1 | 10/2010 | Harrison et al. | |
| 2010/0275703 A1 | 11/2010 | Mcanally et al. | |
| 2011/0284288 A1 * | 11/2011 | Sawyer | E21B 49/005 175/24 |
| 2016/0123792 A1 * | 5/2016 | Plaziak | G01F 1/32 73/1.16 |
| 2016/0349176 A1 * | 12/2016 | Takezawa | G01N 9/36 |
| 2018/0313214 A1 * | 11/2018 | Xia | E21B 47/00 |

OTHER PUBLICATIONS

International Search Report and the Written Opinion of the International Search Authority, or the Declaration, dated Apr. 21, 2015, PCT/US2014/047832, 17 pages, ISA/KR.

* cited by examiner

THERMAL MODULATED VIBRATING SENSING MODULE FOR GAS MOLECULAR WEIGHT DETECTION

The present application is a Divisional of U.S. patent application Ser. No. 15/311,246 filed Nov. 15, 2016, which is a U.S. National Stage patent application of International Patent Application No. PCT/US2014/047832, filed on Jul. 23, 2014, the benefit of which is claimed and the disclosures of which are incorporated herein by reference in their entirety.

FIELD OF THE DISCLOSURE

The present disclosure generally relates to the identification of wellbore formation fluids and, more particularly, to averaged gas molecular weight detection with a thermal modulated vibrating sensing module, and related methods utilized for in-situ identification of wellbore formation gas fluids.

BACKGROUND

Averaged gas molecular weight (MW) is closely related to the hydrocarbon composition of wellbore formation fluid from a hydrocarbon gas reservoir and to the pressure-temperature diagram of a multi-component system with a specific overall composition. As understood in the art, pressure and temperature can alter gas density, and the measured formation fluid density can vary significantly from dry, wet or saturated gases. However, different from the temperature and pressure dependent density, average gas molecular weight of a hydrocarbon gas mixture will be the same if the reservoir composition is kept constant, regardless of the temperature and pressure variations. The averaged gas molecular weight variation may provide a direct correlation to formation gas fluid composition and properties, which is normally obtained only by offline gas chromatography analysis.

Gas molecular weight detection is a particularly important concept in the field of flow measurement, as the varying densities of the constituent material may present a significant problem in natural gas production. The natural gas is a mixture of hydrocarbon compounds, dominated by C1-C4, with quantities of various non-hydrocarbons such as $N_2$ and $H_2$. However, extra small quantities of C5+ may also exist in the liquid phase. The amount of hydrocarbons present in the liquid phase of the wet gas extracted depends on the reservoir temperature and pressure conditions, which change over time as the gas and liquid are removed.

Changes in the liquid and gas contents also occur when a wet gas is transported from a reservoir at high temperature and pressure to the surface where it experiences a transition from high temperature and pressure downhole condition to a lower surface temperature and pressure. The presence and changeability of this wet gas can cause problems and errors in the ability to accurately meter the gas phase flowrate.

To measure gas molecular weight, a conventional laboratory method is to use either gas chromatography (GC) or gas chromatography (GC) and mass spectroscopy (MS) combined GC-MS instrument. The measured hydrocarbon gas molecular weight could provide a direct correlation with gas reservoir composition, which is normally obtained only by offline gas chromatography analysis. However, one of the inherent technical barriers is the use of the long capillary-like column based isothermal gas separation retention time analysis. The other challenge is instrument operation under high temperature and pressure conditions that vary with depth of the downhole. To date, no technical breakthrough has been made in the area of downhole gas molecular weight measurement in downhole conditions for reservoir composition analysis and variation trend monitoring.

Therefore, there is a need in the art to provide an in-situ identification of a wellbore formation fluid composition and properties.

DESCRIPTION OF ILLUSTRATIVE EMBODIMENTS

Figure 1A:
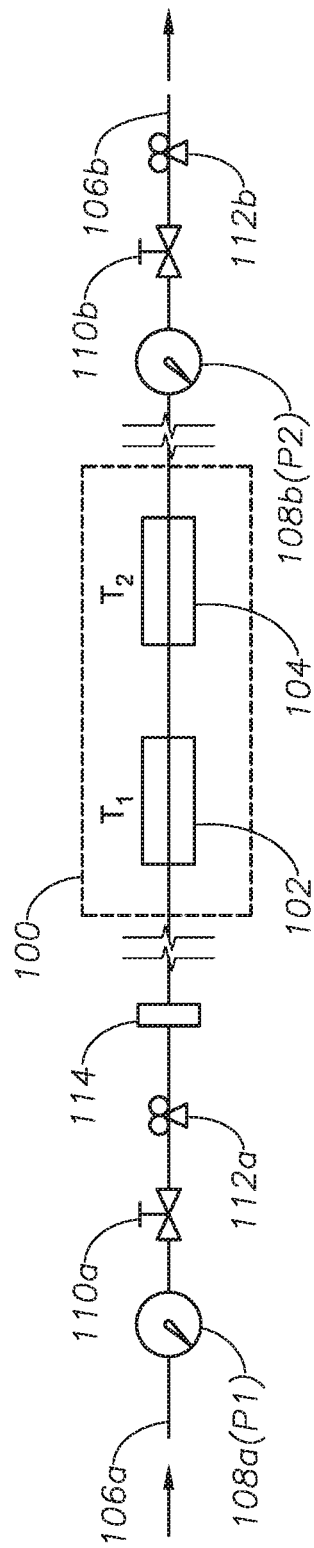
FIG. 1A is block diagrammatical illustration of a thermal modulated vibrating tubing based gas molecular weight sensing module according to certain illustrative embodiments of the present disclosure.

Illustrative embodiments and related methodologies of the present disclosure are described below as they might be employed for in-situ wellbore formation fluid composition analysis using a thermal modulated vibrating sensing module. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methodologies of the disclosure will become apparent from consideration of the following description and drawings.

As described herein, embodiments of the present disclosure are directed to a thermal modulated vibrating sensing module that can be used to measure gas molecular weight from wellbore formation fluids, which is then correlated to gas composition. In a generalized embodiment of the present disclosure, the sensing module includes a pair of gas sensors, each comprising a vibrating tube having a mechanism thereon for vibrational excitation and signal acquisition. Each gas sensor includes a thermal modulated hollow tube body having a venturi inlet and outlet to regulate fluid flow uniformity. The vibrating tube is coupled between the venturi inlet and outlet. Pressure and temperature sensors are positioned along the sensing module to provide temperature and pressure compensated vibrational measurements from the resonant frequency of the vibrating tube. The sensing module may be utilized as a standalone device for gas production monitoring, or as part of a downhole assembly such as, for example, a sampling tool deployed along a wireline or drilling assembly for identifying formation fluid composition (such as gas, oil, water or their mixtures). In addition, in certain embodiments, the averaged gas molecular weight could be an indicator of the reservoir composition.

During formation fluid production operations of the generalized embodiment, wellbore formation fluid flows into the sensing module and to the first and second gas sensors (also referred to herein as gas sensor packages), which are operated under temperatures $T_1$ and $T_2$, respectively. As the formation fluid flows through the vibrating tubes, the resonant frequencies of the hollow tubes are simultaneously measured at two different temperature operating modes, and each gas sensor package is kept in an isothermal status. These vibrational measurements include the resonant frequencies of the vibrating tubes as the formation fluid flows through (for gas density determination), in addition to the temperature and pressure measurements of each gas sensor. The differential pressure measurements across the sensing module are then utilized to determine the gas molecular weight of the formation fluid.

Embodiments of the present disclosure are useful to analyze a number of different formation fluid compositions. In one embodiment, the sensing module may be used for in-situ dry gas well analysis. In another embodiment, the sensing module can be used for wet gas analysis, where the small quantity of formation liquid may coexist with the gas. In a third embodiment, the gas sensing module may be used for saturated gas analysis, where gas can separate from the crude oil in the formation fluid when pressure is above the bubble point. Accordingly, the use of various embodiments of the present disclosure provided are to enhance sampling tool abilities for in-situ averaged gas molecular weight measurements of dry, wet, and saturated hydrocarbon gas reservoirs.

As will be understood by those ordinarily skilled in the art having the benefit of this disclosure, wellbore fluid is a mixture of various hydrocarbons, and their averaged molecular weight can be obtained by first measuring each individual gas composition, then, then determining each gas composition's mole percentage or weight percentage. Traditionally, this is done in a laboratory condition using a gas chromatography technique. However, embodiments of the present disclosure provide a sensing module discussed that directly measures averaged gas molecular weight without the need to identify each gas composition and its percentage in total volume.

As will be understood by those ordinarily skilled in the art having the benefit of this disclosure, average gas molecular weight is closely related to the hydrocarbon composition of wellbore formation fluid from a hydrocarbon gas reservoir, in addition to being closely related to the pressure-volume-temperature ("PVT") diagram or equation of the state ("EOS") of a multi-component gas mixture reservoir with a specific overall composition and averaged molecular weight. Therefore, the in-situ measurement of gas molecular weight in the downhole environment described herein will identify the naturally occurring hydrocarbon gas reservoirs and predict phase behavior of the formation fluid. For example, a $CH_4$ or $C_1$ dominated natural gas production well may have an averaged molecular weight of equal and greater than 16 g/mol, but any additional $C_2$-$C_5$, $N_2$, and $CO_2$ could increase the measured molecular weight in a small amount, but averaged gas molecular weight could be an indicator of the gas reservoir composition stability.

As described in further detail below, the measured hydrocarbon gas molecular weight provides a direct correlation to the gas composition of the formation fluid, which in conventional approaches is normally obtained by time-consuming offline gas chromatography analysis. Through use of embodiments of the present disclosure, however, analysis of fluid composition may be conducted in real-time to thereby provide immediate analysis of the hydrocarbon gas composition. As a result, downhole sampling tools, such as the Halliburton RDT™, will have added service capability for use in both crude oil and hydrocarbon gas reservoirs.

FIG. 1A is a high-level block diagrammatical illustration of a thermal modulated vibrating tube based gas molecular weight sensing module 100 according to certain illustrative embodiments of the present disclosure. Sensing module 100 includes first gas sensor 102 and second gas sensor 104, which are connected to one another in series fashion. First and second sensors 102 and 104 are operated under isothermal temperatures $T_1$ and $T_2$, respectively, as will be described in more detail below. In this illustrative embodiment, sensing module 100 is attached to various flow control mechanisms via a front flow line 106a and back flow line 106b. As shown, a pressure gauge 108a, gas flow inlet control valve 110a, pressure and flow regulator 112a and a coalesce filter 114 are coupled in series fashion along front flow line 106a.

During operation, coalesce filter 114 performs gas purification by blocking debris and solid particles, and minimizing erosions to chokes, flow lines, control valves, and other sensor packages. In some cases, the coalesced water droplets are repelled by hydrophobic barrier layers. In another case, a separator filter with a two-stage vertical coalescer and separator housing will be used to separate gas from hydrocarbon liquid. For practical application, a microporous film produced from ultra-high molecular weight polyethylene ("UHMW") or low-density porous PTFE filters could be used in high-temperature (up to 500° F.) for venting of the gases while holding oil, liquid and water separation. In a more practical operation, a controlled operation temperature and pressure could render the formation fluid in the pure gas phase from its phase diagram. Connected in series along back flow line 106b is another pressure gauge 108b, gas flow outlet 110b, and a back pressure and flow regulator 112b, all used to maintain differential pressure and constant flow stability through sensing module 100.

Front and back flow lines 106a,b are in fluid communication with a source of wellbore formation fluid. In those examples in which sensing module 100 is used as a stand-alone device (e.g., in a laboratory setting), lines 106a,b may couple to gas supply pipeline. In those embodiments in which sensing module 100 was used in a downhole environment as part of a sampling tool, flow lines 106a,b would be connected to a downhole tool flow control unit in which to receive wellbore formation fluids under a constant differential pressure. Those ordinarily skilled in the art having the benefit of this disclosure readily understand there are a variety of ways in which to coupled flow lines 106a,b.

Figure 1B:
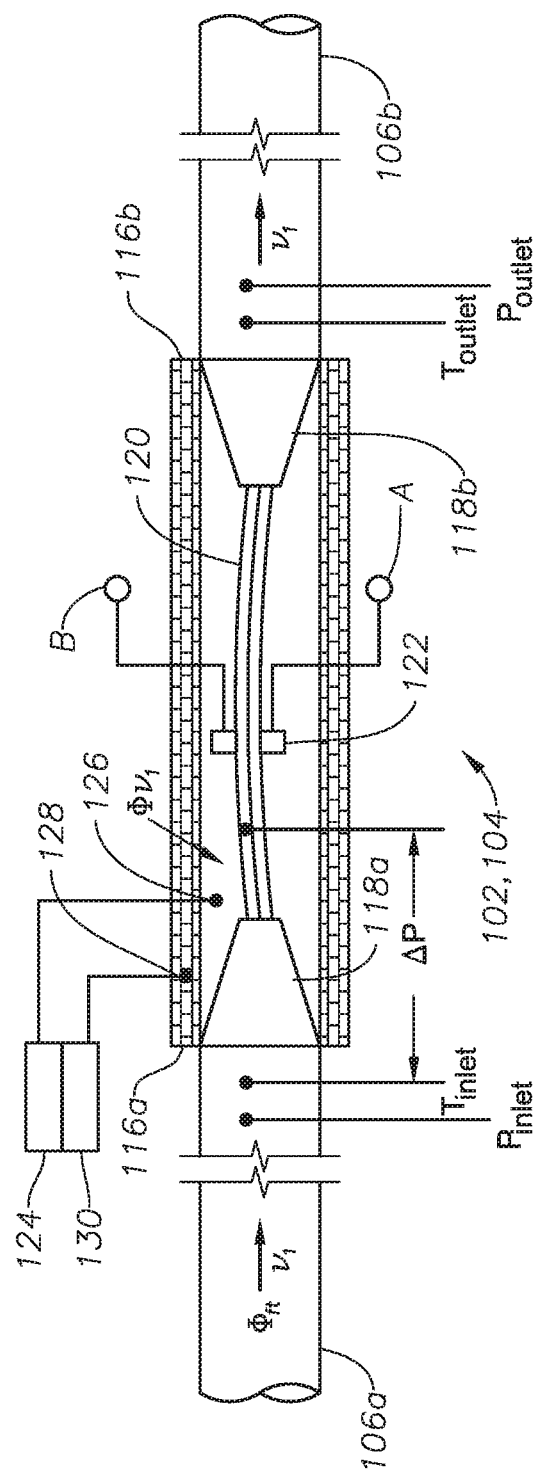
FIG. 1B is an exploded view of a single gas sensor package, according to certain illustrative embodiments of the present disclosure.

FIG. 1B is an expanded view of a single gas sensor 102,104, according to certain illustrative embodiments of the present disclosure. Gas sensor 102,104 includes a hollow tube body 116 having a first end 116a and second end 116b. A venturi inlet 118a is positioned at first end 116a, and a venturi outlet 118b is positioned at second end 116b. A vibrating tube 120 is fluidly coupled between venturi inlet 118a and outlet 118b. Vibrating tube 120 is a tube through which wellbore formation fluid flows during operation of sensing module 100. Vibrating tube 120 may be made of high-strength titanium (Ti) metal, Ti-alloy, carbon fiber reinforced polymer composites (such as PPS and PEEK), with a typical length of 4-10" and diameter of 0.1-0.4". In most of cases, these tubing materials will work under 400° F. and 25 kpsi downhole conditions.

Venturi inlet/outlet 118a,b allows control of fluid uniformity and pressure through the gas sensors 102,104. Specifically, when using a relative long tube for increasing the sensor gas sensitivity, the limited gas flowing rate may affect the density and gas molecular weight measurement accuracy if the sensing tube only is not fully filled. The large ratio of the external/internal tube diameters will enable the gas flow rate increase and thereby increase measurement accuracy.

A vibrational mechanism 122 is positioned on vibrating tube 120 to excite tube 120 into vibration. In certain illustrative embodiments, vibrational mechanism 122 may be a magnet or coil assembly coupled to processing circuitry (not shown) via line A whereby excitation signals are communicated. Vibrational mechanism 122 may also be utilized for signal pickup/acquisition via line B, whereby vibrational measurements (e.g., resonant frequency, gas density, temperature, pressure measurements) are communicated to the processing circuitry.

Still referring to FIG. 1B, inlet flow line 106a has a size of $\phi_{fl}$, and the gas flow from line 106a to vibrating tube 120 has a size of $\phi_{vt}$, where $\phi_{fl} > \phi_{vt}$. Such flow tube different sizes result in a venturi operating mode whereby the higher temperature operation surrounding the vibrating tube ensures the formation fluid is in a single gaseous phase. In this example, gas sensor 102,104 also includes a temperature control loop feedback mechanism 124 coupled to a temperature sensor 126 positioned inside the cavity of hollow body 116. Feedback mechanism 124 may be, for example, a proportional-integral-derivative ("PID") controller, based on either PRT100 or RTD, which is utilized to maintain gas sensor 102,104, and thus sensing module 100, in an isothermal condition.

A heating element (not shown) is embedded into a layer of the body of hollow tube 116 to thereby maintain the desired temperature of gas sensor 102,104. Another temperature sensor 128 is embedded into the heating element and connected to a thermometer 130, which is controlled and coupled to control loop feedback mechanism 124. Although not shown, feedback mechanism 124 is also coupled to processing circuitry. Via the use of sensors 126 and 128, the temperature of gas sensor 102,104 may be monitored and controlled.

As previously described, vibrational excitation mechanism 122 is attached to the surface of vibrating tube 120 for excitation and signal pick up. The front and rear fluid pressures and temperatures ($P_{Inlet}$, $T_{Inlet}$, $P_{Outlet}$, $T_{Outlet}$) of the formation fluid can be measured before and after gas flow through gas sensor 102,104 via temperature/pressure sensors (not shown). As will be described in more detail below, the density variation of the wellbore formation fluid will be measured through use of the venturi vibrating tube resonant frequency shift between the first and second sensors (FIG. 1A), accompanied by the simultaneous measurement of the inlet and outlet temperature ($T_{Inlet}$, $T_{Outlet}$) and pressure ($P_{Inlet}$, $P_{Outlet}$).

Figure 2A:
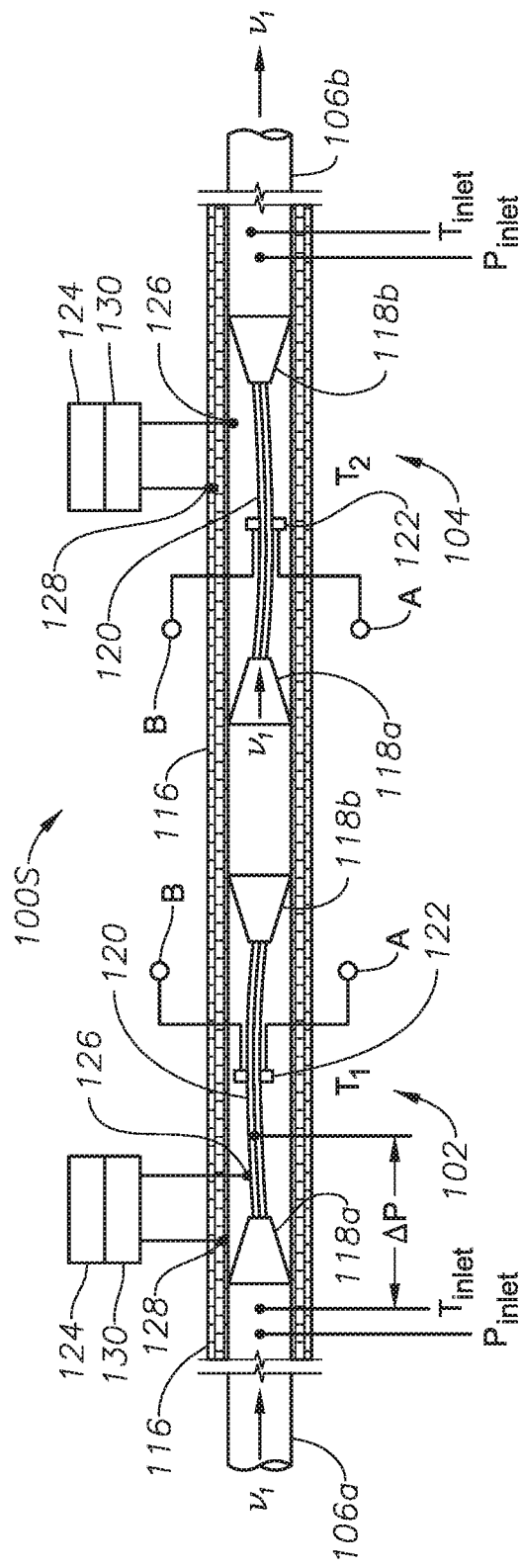
FIGS. 2A and 2B are alternative illustrative embodiments of gas sensing module in which two gas sensors are arranged in series configuration (FIG. 2A) and parallel configuration (FIG. 2B)
Figure 2B:
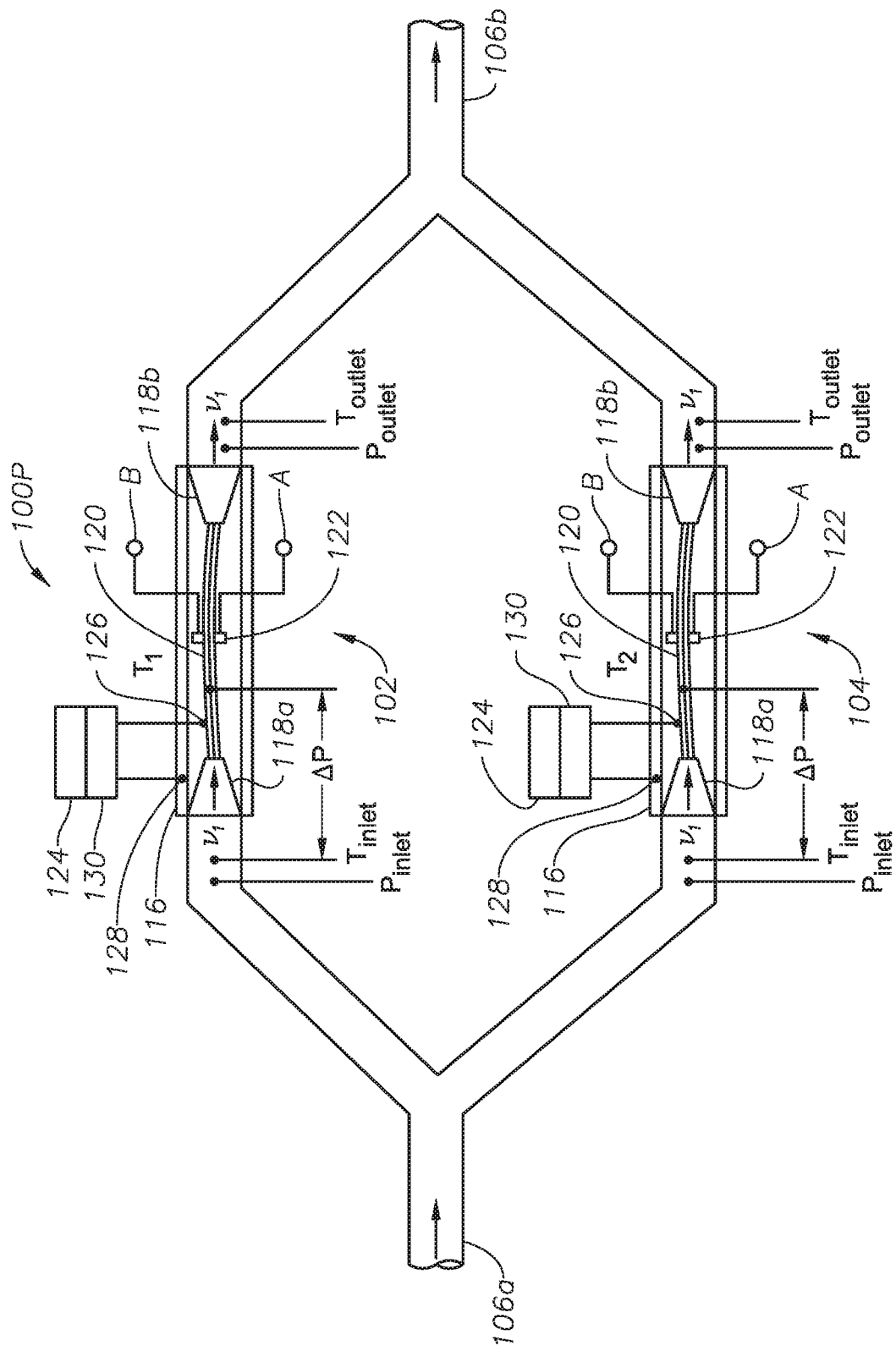

With reference back to the illustrative embodiment of FIG. 1A, gas sensing module 100 consist of a pair of isothermal feedback controlled vibrating tube-based sensors 102,104, with first sensor 102 operated at temperature $T_1$, and second sensor 104 operated at $T_2$. FIGS. 2A and 2B are alternative illustrative embodiments of gas sensing module 100 in which sensors 102,104 are deployed in series configuration (FIG. 2A) and parallel configuration (FIG. 2B). In FIG. 2A, first and second gas sensors 102a,b are connected to one another in series fashion whereby venturi outlet 118b of first sensor 102 is connected to venturi inlet 118a of second sensor 104. During an illustrative operation of gas sensing module 200S of FIG. 2A, wellbore formation gas fluid flows through sensor 102 that has an operating temperature at $T_1$, then, the formation fluid passes through second gas sensor 104 that has a higher operating temperature at $T_2$. As a result of the vibration of tube 120, first and second sensors 102,104 will show first and second resonant frequencies:

$$f(\rho_1,T_1)=f_1(To)+a^*T_1+b^*\rho_1, \text{ and } f(\rho_2,T_2)=f_2(To)+a^*T_2+b^*\rho_2 \qquad \text{Eq(1)},$$

where f is frequency, $\rho$ is gas density, T is sensor operation temperature, and $f_1(To)=f_2(To)$. The relative frequency differentiation between gas sensors 102 and 104 is approximately expressed as:

$$\Delta f(\rho)=f(\rho_1,T_1)-f(\rho_2,T_2)=a^*(T_1-T_2)+b^*(\rho_1-\rho_2) \approx f(\Delta T)+b^*\Delta\rho \qquad \text{Eq(2)},$$

where a and b are calibration constants at pre-set $T_1$ and $T_2$ with a known gas density or molecular weight. For each individual sensor 102 or 104, the gas molecular weight (MW) is approximately described by:

$$MW \approx R \cdot T^* \rho/(z \cdot P), \text{ with } T_1/T_2=\rho_2/\rho_1, \qquad \text{Eq. (3)},$$

where z is 1 for ideal gas, but deviates from 1 for non-ideal gas mixtures.

For a constant gas mixture composition, the density difference will be proportional to relative gas molecular weight (MW) change, namely, $$\Delta\rho \approx (z \cdot P/R \cdot T) \cdot \Delta MW \qquad \text{Eq. (4)}.$$

In such an operational mode, each gas sensor may provide measured gas molecular weight, and the differential signal of the two gas molecular weights may be directly used for production quality monitoring as indicated by Eq. (4), where gas composition variation could vary measured gas density difference.

In FIG. 2B, gas sensing module 100P includes first and second gas sensors 102,104 arranged in a parallel configuration relative to one another. In this embodiment, inlet flow line 106a is a flow splitter that divides the wellbore formation fluid in a percentage of 0-100%, for example, between first gas sensor 102 and second gas sensor 104, whereby the fluid is then communicated onto venturi inlets 118a of first and second gas sensors 102,104. After the formation fluid has traversed first and second gas sensors 102,104, it is then recombined at outlet flow line 106b (which is coupled to venturi outlets 118b of sensors 102,104). In an illustrative operation mode, the flow splitting ratio is 0 or 100%, where the gas flows through only one of the gas sensors at one time if the flow is controlled by an automatic switch valve.

To prevent gas backflow or interference from outlet flow line 106b, a solenoid valve (not shown) should be used. For wet or saturated gas analysis, the gas sensing module 100P may require a filter for gas and liquid separation in the front of flowline 106a. Such a filter could be a coalesce or centrifugal-based filter that can separate heavy liquid from wet gas stream and thereby allow the gas phase to flow past sensor 102, 104. For example, a microporous film produced from UHMW polyethylene or lo-density porous PTFE filters could be used in high-temperatures (up to 500° F., for example) for venting of the gases while maintaining oil, liquid and water separation. However, the separated hydrocarbon liquid will be forced to pass through the other gas sensor (second sensor 104 in FIG. 2B), while the gas phase will pass through the sensor (first gas sensor 102). In such configurations, when both gas sensors are operated under the same operating temperature, the measured gas molecular weight difference will indicate potential wet gas or saturated gas flows by setting $T_1=T_2$ in Eq. (1)

The results from the differential measurement from Eq. (2) should be close to zero. Otherwise, the potential wet gas or saturated gas may exist when the surrounding environment is kept constant in both temperature and pressure.

Now that the an overview of the mathematical theory has been given in Equations 1-4, a more detail description of the method by which gas molecular weight is calculated will now be described. In certain methods, gas molecular analysis starts by measuring the wellbore formation fluid (e.g., multi-component hydrocarbon gas mass) using first and second gas sensors 102,104 to thereby determine a first and second gas density using:

$$\rho_{1,2}(T,f)=\rho(0)+\zeta \cdot Y(T)/(f(T) \cdot L)^2 \qquad Eq(5),$$

where $Y(T)=Y(0)+c^*T+d^*T^2+\ldots$ is the temperature dependent Young modulus of vibrating tube 120 with c and d as constants, L is the length of the vibrating tube, and $\zeta$ is the calibration parameter. In certain embodiments, the natural vibrational frequency range of tube 120 is from a few hundred Hz to 20 kHz.

Therefore, for dry gas, the gas molecular weight, under an ideal case, can be expressed as in terms of gas density as:

$$\rho_1=\rho(0)+(MW)^*z \cdot P_1/RT_1 \qquad Eq(6), \text{ and}$$

$$\rho_2=\rho(0)+(MW)^*z \cdot P_2/RT_2 \qquad Eq(7),$$

Where $\rho_1$ is the first gas density, $\rho_2$ is the second gas density, R is the universal gas constant, and $P_1$ and $P_2$ are the pressures inside vibrating tubes 120, and $\rho(0)$ is the sensor calibration constant at T(0). The differentiation of the two gas densities $\rho_1$ and $\rho_2$ is:

$$\Delta\rho(T_1,T_2)=(MW)^*(P_1/T_1-P_2/T_2)/R \qquad Eq(8), \text{ or}$$

$$MW=(\rho_1-\rho_2)^*R/(P_1/T_1-P_2/T_2). \qquad Eq(9).$$

In an alternate method, for dry hydrocarbon gas analysis, two vibrating tube operation temperatures $T_1$ and $T_2$ are preset, along with the feedback control mechanism 124 to thereby maintain isothermal status operation. When the flowline inlet (106a) pressure P is known, the pressure ($P_1$, $P_2$) inside vibrating tubes 120 can be calculated by:

$$\Delta P=(P-P_i)=\frac{1}{2}^*\rho^*(\upsilon_2^2-\upsilon_1^2), i=1 \text{ and } 2 \qquad Eq(10)$$

where $\rho$ is the fluid density, $\upsilon_1$ and $\upsilon_2$ are flow velocities before gas flowing into the gas sensors 102,104 and inside vibrating tube 120, respectively. For high-accuracy measurement, both $T_1$ and $T_2$ should be relative higher than the downhole formation fluid temperature. The measured gas molecular weight is more or less insensitive to sensing module thermal drifting effects by:

$$1/(T_1+\Delta T)-1/(T_2+\Delta T) \approx 1/T_1-1/T_2, \text{ where } \Delta T<<T_1 \text{ and } T_2 \qquad Eq(11),$$

where gas sensors 102,104 have the same venturi structure (e.g., length, material, etc.) and internal tube pressures $P_1=P_2$. On the other hand, the gas flow rate along the flowline 106 is another factor which could lead to gas stream temperature variation. To combat this, feedback mechanism 124 maintains the sensing module in isothermal condition, which greatly mitigates the effects of thermal drift under downhole conditions. Such an isothermal package is critical especially the downhole logging tool is working along wellbore at different depths or temperature zones.

Figure 3A:
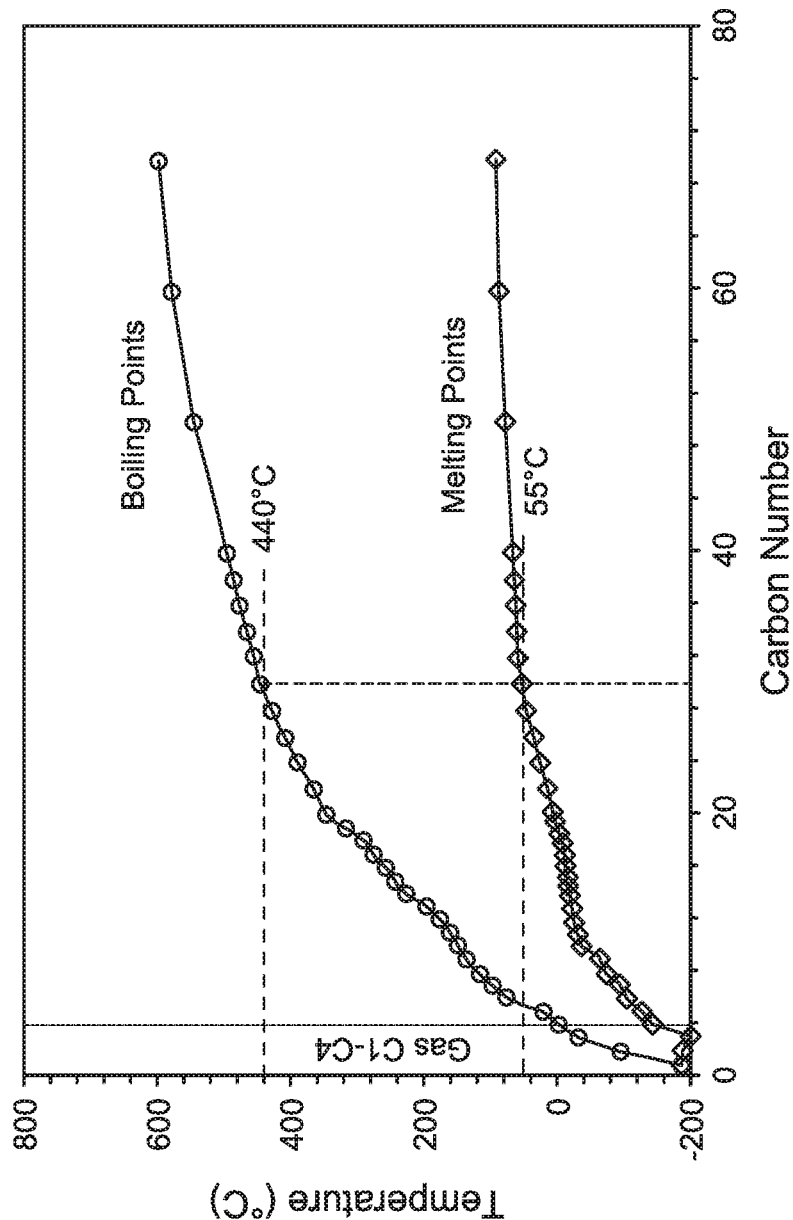
FIGS. 3A and 3B are plots showing hydrocarbon boiling points and molecular weight as a function of the carbon number, respectively.
Figure 3B:
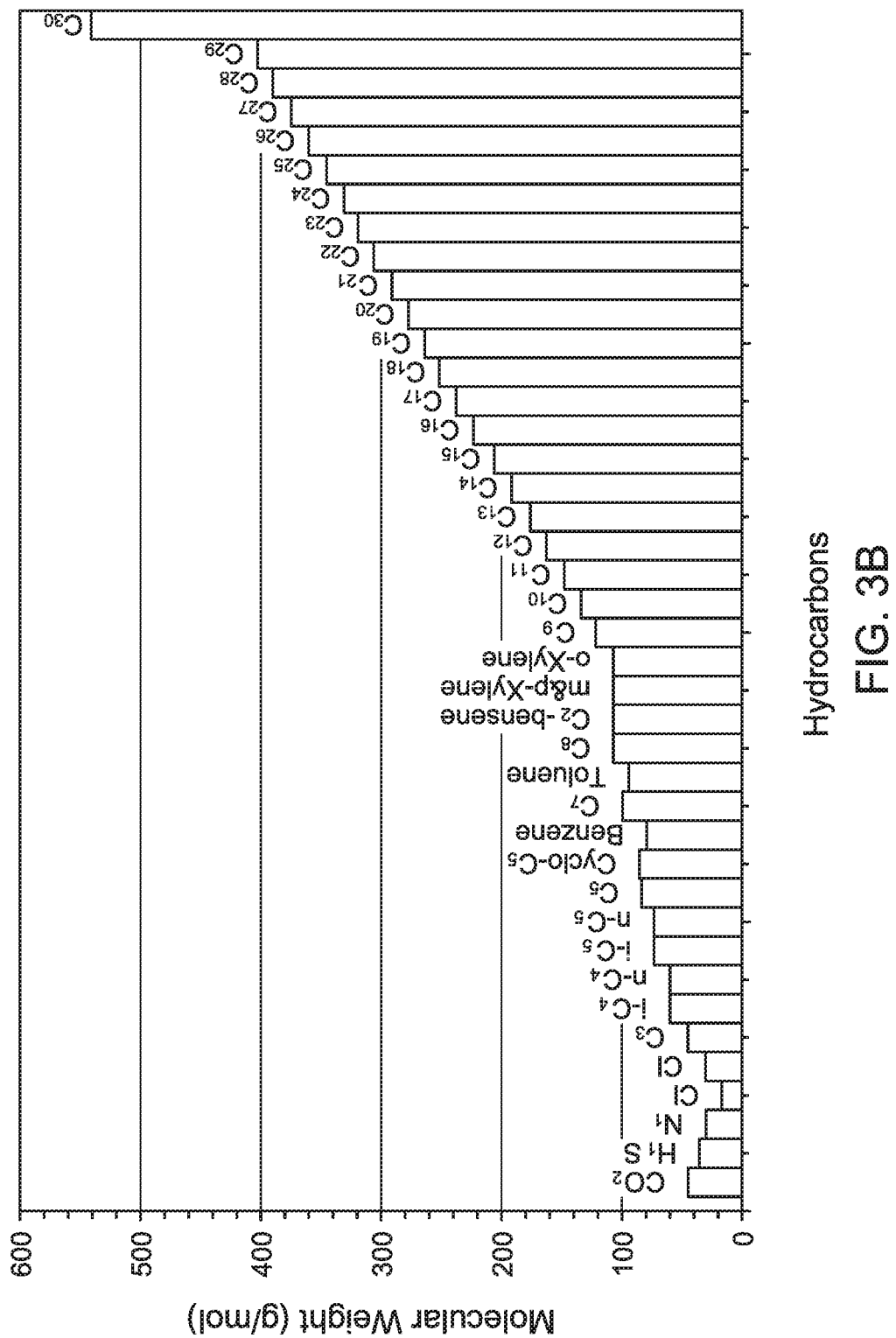

In yet another method, for wet and saturated hydrocarbon gas analysis, the pre-set temperature $T_1$ can be the maximum of the downhole formation fluid temperature, but $T_2$ may be preset as high as allowed (based upon tool design), such as, for example, from 350° F. (177° C.) to 800° F. (427° C.). As a result, most of the "wet gas" or gas mixed with some low-density mixture of hydrocarbon liquid can be flushed as vapors if $T_2$ is greater than the liquid boiling point. FIGS. 3A and 3B are plots showing hydrocarbon boiling points and molecular weight as a function of the carbon number, respectively. Thus, in this illustrative method, FIGS. 3A and 3B may be used as a reference to set the $T_2$ value. As can be seen in the graphs, for hydrocarbon formation fluid with a carbon number up to 20, the boiling point is about 300° C.; however, the boiling point will be about 440° C. for carbon number up to 30. Thus, the corresponding gas molecular weight can change more than 100 g/mol. In this method, the following may be utilized to calculate molecular weight:

$$MW=[\rho_2(\text{gas})-\rho(0)]^*R^*T_2/\Delta P \qquad Eq(12).$$

Figure 4:
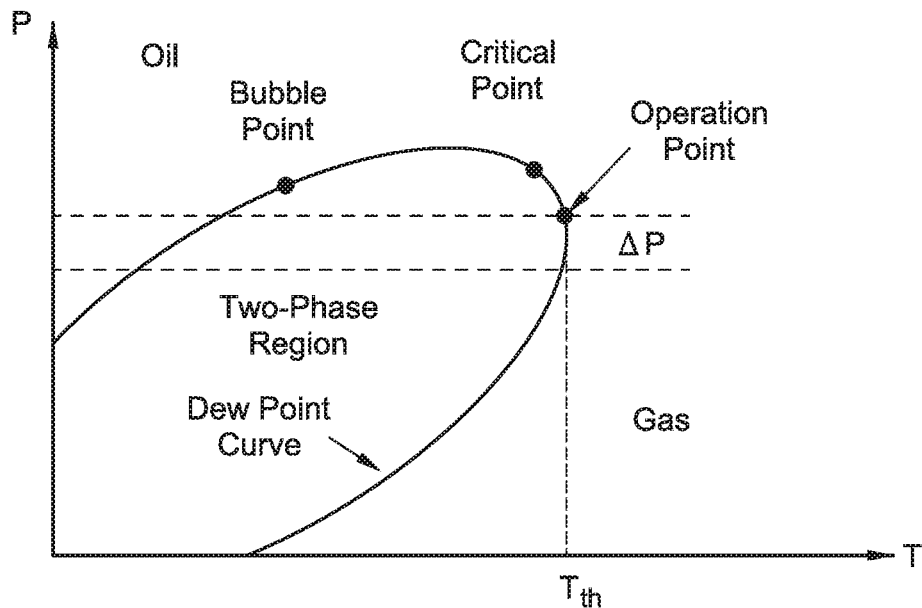
FIG. 4 is a pressure-temperature phase diagram that is used for fluid phase control, according to an illustrative method of the present disclosure.

In yet another illustrative method of the present disclosure, to control the fluid phase during wet and saturated hydrocarbon gas analysis, the vibrating tube operational temperature ($T_1$, $T_2$), inlet pressure $P_{inlet}$ (shown in FIGS. 1B, 2A and 2B), and differential pressure $\Delta P$ may be pre-set to the proper operating point based upon the pressure-temperature ("PT") phase diagram, as shown in FIG. 4. In most cases, by using an operation temperature higher than a threshold temperature ($T>T_{th}$) that is outside the two-phase regime or dew-point curve, the formation fluid will be driven to the gas phase, as represented by the dashed vertical line in FIG. 4. In addition, the configuration of gas sensors 102,104 may be utilized to reduce the gas pressure inside vibrating tube 120 by using a $\Delta P$ that shifts the operation point outside the two-phase region of FIG. 4 to thereby achieve single gas phase operation.

However, when the operating temperature of the sensing module is maintained below $T_{th}$, the flowline inlet pressure P may be set higher than the operation point of FIG. 4 to thereby force gas phase operation that can turn two-phase formation fluid into single-phase gas flow. For this purpose, temperature feedback mechanism 124 is provided and fluid line differential pressure may be also adjusted as necessary.

Furthermore, in yet other illustrative methods, note that under a non-ideal gas situation where $z\neq 1$, the multi-component hydrocarbon gas molecular weight should be analyzed by:

$$MW \approx (\rho_1-\rho_2)^*V^*(V+b')^*R^*(1/T_1^{1.5}-1/T_2^{1.5})/a' \qquad Eq(13),$$

where a' $(0.4278^*R^2^*T_c^{2.5}/P_c)$ and b' $(0.0867^*R^*T_c/P_c)$ are van der Waals constants, defined by the Redlich-Kwong equation at critical temperature, $T_c$, and critical pressure $P_c$; V can be taken as gas mole volume. The measured gas molecular weight could be used to determine whether the formation fluid composition is dry, wet or saturated gas. Eq.

(13) can be used for interpreting the field measured data from Eq. (12) with EOS based PVT modeling and simulation.

Figure 5:
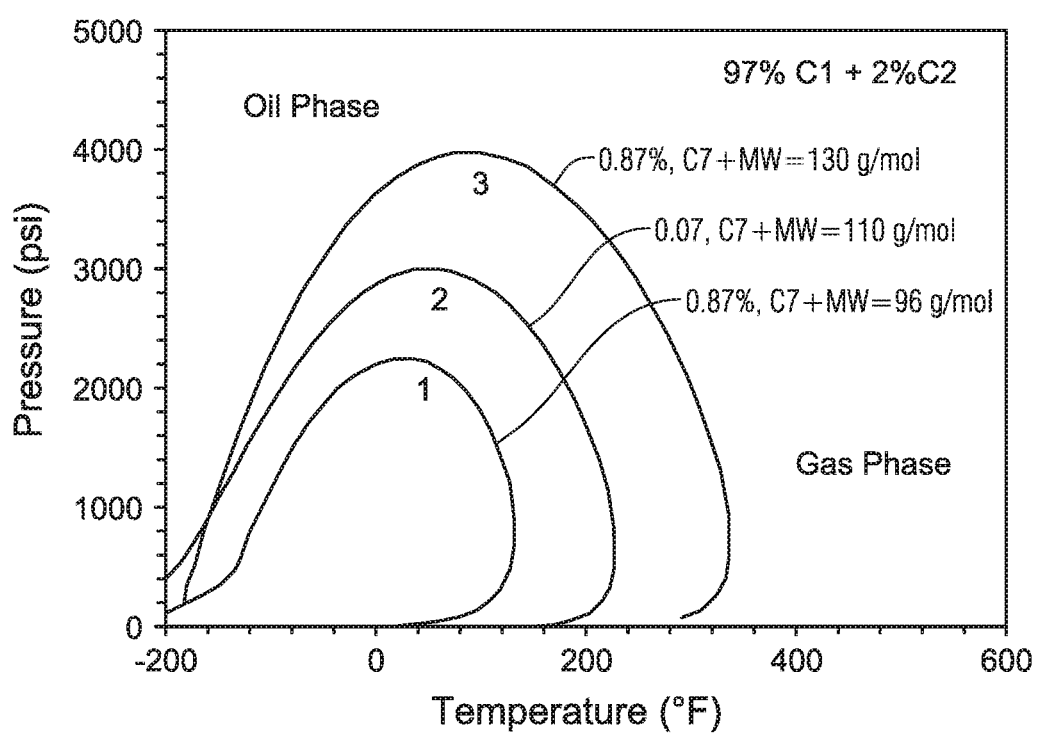
FIG. 5 is a diagram illustrating the pressure-temperature phase envelop under three different gas molecular weights, according to an illustrative method of the present disclosure.

In another illustrative method, the measured gas molecular weight can be used to calculate EOS for identifying the naturally occurring hydrocarbon gas reservoirs and to predict possible phase behavior of the formation fluid, as shown in FIG. 5 using a simulation based on 97% C1 (CH$_4$, Methane, MW=16.04 g/cm$^3$), and 2% C2 (C$_2$H$_6$, Ethane, MW=30.07 g/cm$^3$) with 0.82% C7+ hydrocarbons. FIG. 5 illustrates the PT phase envelop under three different gas molecular weights. In reality, 0.87% C7+ may have different molecular weights, such as from 90 to a few hundreds g/cm$^3$, for example. In one case, a gas reservoir may consist primarily of C1-C4 hydrocarbon gas, but the 0.82% C7+ may have an averaged molecular weight of 97 g/cm$^3$. In another case, the 0.82% C7+ may have an averaged molecular weight of 110 g/cm$^3$, while in another case, the 0.82% C7+ may have an averaged molecular weight of 130 g/cm$^3$. Although the average gas molecular weight only changes from 18.293, 18.402, to 18.566 g/cm$^3$ in this example, the PT phase envelop diagram, as shown in FIG. 5, has changed dramatically.

In FIG. 5, it is clear that the high carbon bonded hydrocarbons of C7-C30 may have limited content as wet gas, which is saturated with ~1% volume of liquid hydrocarbons, but the gas molecular weight increase could indicate the corresponding PT phase envelop change, which may have a high impact on the well completion design or asset management. The measurement of the average gas molecular weight also can help to understand the transport properties of hydrocarbons through different layers of the subsurface formation. In one example, the increase of the water will decrease measured average gas molecular weight. In another example, because of localized geothermal anomalies, the heavy oil evaporated gas could increase averaged gas molecular weight. In yet another example, carbon dioxide may become rich due to specific geological regions that also increase the measured averaged gas molecular weight. These hydrocarbon gas composition changes will modify a well's PT phase envelop diagram. Accordingly, the simulation described here shows that the critical point and gas/liquid due-point curve can be changed by an increase a small amount of the gas molecular weight.

As previously mentioned, wet gas detection is a particularly important concept in the field of flow measurement, as the varying densities of the constituent materials present a significant problem. Using embodiments of the present disclosure, the gas molecular weight measurements provide a new method by which to evaluate downhole formation fluid properties. In certain embodiments, the gas sensor modules may be deployed with an existing RDT sampling tool after integration, or as part of a downhole assembly such as, for example, an independent service of logging-while-drilling ("LWD") or measurement-while-drilling ("MWD").

In certain embodiments, the methods described above may be performed by processing circuitry onboard a gas sensing module or located at some remote location. In either case, such processing circuitry would comprises a signal processor, communications module and other circuitry necessary to achieve the objectives of the present disclosure, as will be understood by those ordinarily skilled in the art having the benefit of this disclosure. In addition, it will also be recognized that the software instructions necessary to carry out the objectives of the present disclosure may be stored within storage located within the processing circuitry or loaded into that storage from a CD-ROM or other appropriate storage media via wired or wireless methods. Such software and processing circuitry will enable the processing of high-volume data and interpretation/correlation of the vibrational measurement time-domain data to gas molecular weight based on the vibrational resonant frequencies. If the processing circuitry is remotely located, a suitable wired or wireless communications link may provide a medium of communication between the processing circuitry and the sensing module. Alternatively, however, the communications link may be an electromagnetic device of suitable frequency, or other methods including acoustic communication and like devices.

Figure 6:
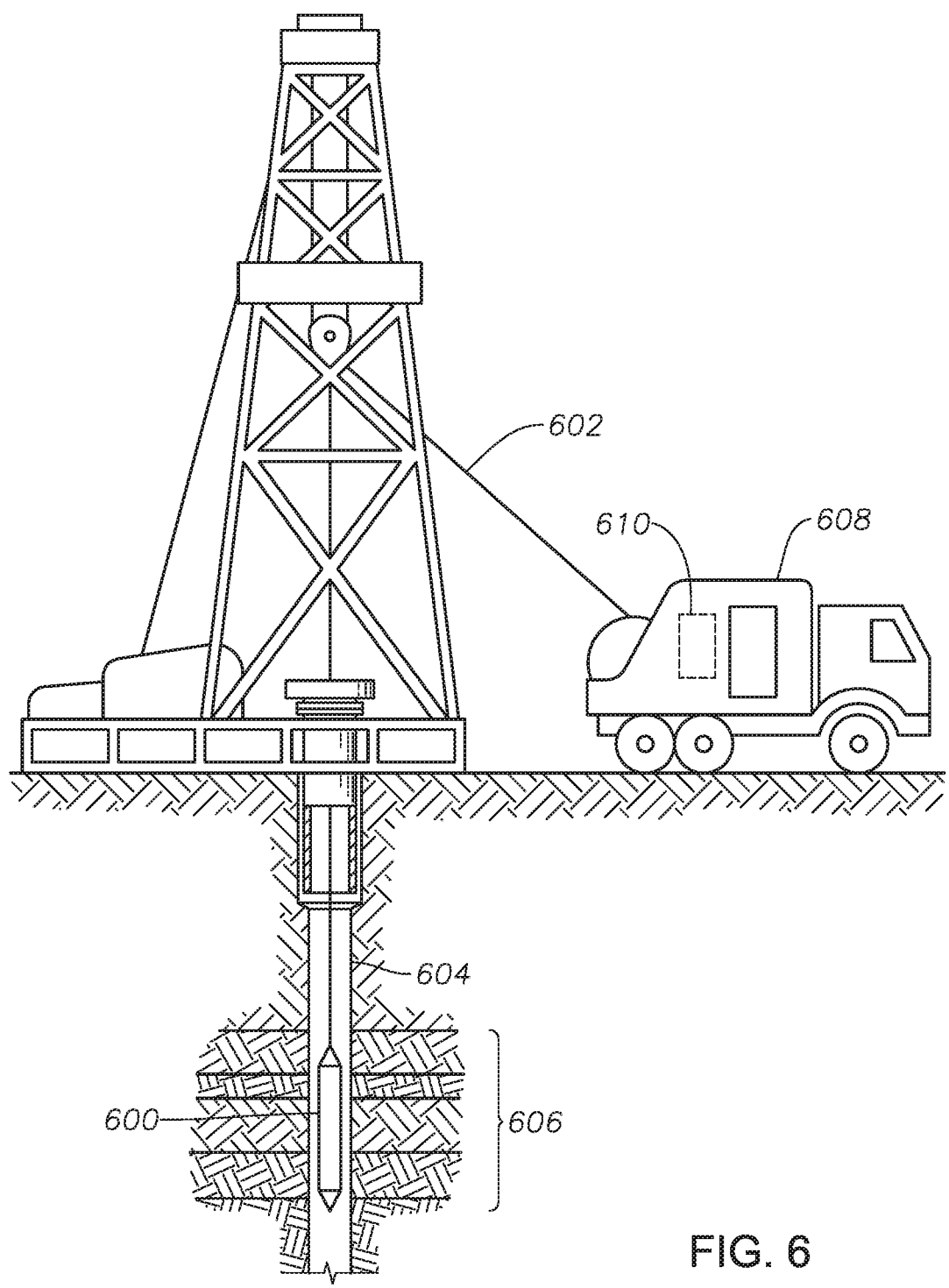
FIG. 6 illustrates an embodiment of the present disclosure whereby a gas molecular weight sensing module is utilized in a wireline application.

FIG. 6 illustrates an embodiment of the present disclosure whereby a gas molecular weight sensing module is utilized in a wireline application. Here, a sampling tool 600 includes a sensing module as described herein, and is shown positioned along wellbore 604. Sampling tool 600 has been suspended along formation layers 606 by a cable 602 having conductors for transporting power to sampling tool 600 and telemetry to/from sampling tool 600 and the surface. In such a deployment, the sampling tool 600 is utilized for formation fluid sampling and the inlet flow line (not shown) will provide pumpout service first to the gas sensing module. Once the formation fluid has been received, the gas sensing module acquires the vibrational measurements utilized to determine the gas molecular weight in-situ as described herein. The vibrational measurement signals could be saved to a memory disk onboard sampling tool 600 and processed in-situ using circuitry onboard tool 600, or transmitted to the surface via cable 602 for well site processing. A logging facility 608 collects measurements from sampling tool 600, and may include circuitry 610 for processing and storing the measurements received from the sensing module of tool 600.

The gas molecular weight sensing modules described herein provide a number of advantages. First, for example, the venturi design and vibrating tube provides highly-sensitive gas molecular weight analysis that solves low gas sensitivity issues suffered by conventional tools. Second, use of the venturi design allows removal desired quantities of low-density hydrocarbon liquid mixtures via manipulation of the pressure and temperature. Third, the ability to pre-set differential operating temperatures of the gas sensors mitigates thermal-drifting and thereby alleviates the need for much of the maintenance and calibration necessary with conventional tools. Fourth, the gas sensing modules may be utilized in a variety of applications, such as, for example, openhole wireline logging or drilling services, or for permanent gas well production control and optimization.

Embodiments and methods described herein further relate to any one or more of the following paragraphs:

1. A method to determine gas molecular weight of wellbore formation fluid, the method comprising receiving wellbore formation fluid into a sensing module comprising a first sensor comprising a tube and a second sensor comprising a tube; vibrating the tubes of the first and second sensors; communicating the wellbore formation fluid through the first and second vibrating tubes; acquiring vibrational measurements of the wellbore formation fluid flowing through the vibrating tubes; and utilizing the vibrational measurements to determine the gas molecular weight of the wellbore formation fluid.

2. A method as defined in paragraph 1, wherein acquiring the vibrational measurements comprises acquiring a first resonant frequency of the vibrating tube of the first sensor as the wellbore formation fluid flows therethrough; acquiring a second resonant frequency of the vibrating tube of the second sensor as the wellbore fluid flows therethrough; acquiring temperature and pressure measurements of the wellbore formation fluid; and utilizing a differentiation between the first and second resonant frequencies to determine a gas density measurement of the wellbore formation fluid.

3. A method as defined in paragraph 1 or 2, wherein the gas density, temperature, and pressure measurements of the wellbore formation fluid are acquired simultaneously.

4. A method as defined in any of paragraphs 1-3, further comprising maintaining the first and second sensors under an isothermal condition.

5. A method as defined in any of paragraphs 1-4, wherein the first and second sensors are maintained at a same temperature.

6. A method as defined in any of paragraphs 1-5, wherein the first and second temperatures are maintained at different temperatures.

7. A method as defined in any of paragraphs 1-6, wherein vibrating the tubes comprises activating an excitation mechanism positioned on the tubes.

8. A method as defined in any of paragraphs 1-7, further comprising utilizing the gas molecular weight to identify the wellbore formation fluid.

9. A method as defined in any of paragraphs 1-8, further comprising utilizing the gas molecular weight to predict phase behavior of the wellbore formation fluid.

10. A method as defined in any of paragraphs 1-9, wherein the sensing module is deployed into a wellbore.

11. A method as defined in any of paragraphs 1-10, wherein the gas molecular weight of the wellbore formation fluid is determined in-situ.

12. A method to determine gas molecular weight of wellbore formation fluid, the method comprising receiving a wellbore formation fluid into a sensing module comprising a tube; vibrating the tube; communicating the wellbore formation fluid into the vibrating tube; acquiring vibrational measurements of the wellbore fluid flowing through the vibrating tube; and utilizing the vibrational measurements to determine the gas molecular weight of the wellbore fluid.

13. A method as defined in paragraph 12, wherein acquiring the vibrational measurements comprises simultaneously acquiring a gas density measurement, temperature measurement, and pressure measurement of the wellbore fluid.

14. A method as defined in paragraphs 12 or 13, further comprising maintaining the sensing module under an isothermal condition with an operation temperature maximum allowed by a downhole logging service tool.

15. A method as defined in any of paragraphs 12-14, wherein vibrating the tube comprises activating an excitation mechanism positioned on the tube.

16. A method as defined in any of paragraphs 12-15, further comprising utilizing the gas molecular weight to identify the wellbore formation fluid.

17. A method as defined in any of paragraphs 12-16, further comprising utilizing the gas molecular weight to predict phase behavior of the wellbore fluid.

18. A method as defined in any of paragraphs 12-17, wherein the sensing module comprises a first and second gas sensor, each of the first and second gas sensors comprising a tube; vibrating the tube comprises vibrating the tubes of the first and second sensors; communicating the wellbore fluid into the vibrating tube comprises: communicating the wellbore formation fluid into the vibrating tube of the first sensor; and communicating the wellbore formation fluid into the vibrating tube of the second sensor; acquiring vibrational measurements of the wellbore fluid comprises: acquiring temperature and pressure measurements of the wellbore fluid traveling through the vibrating tube of the first sensor; acquiring a first gas density measurement of the wellbore fluid traveling through the vibrating tube of the first sensor; acquiring temperature and pressure measurements of the wellbore fluid traveling through the vibrating tube of the second sensor; and acquiring a second gas density measurement of the wellbore fluid traveling through the vibrating tube of the second sensor; and determining the gas molecular weight of the wellbore fluid is achieved using a differentiation of the first and second gas density measurements.

19. A method as defined in any of paragraphs 12-18, wherein: the sensing module comprises a first and second gas sensor arranged in series configuration with relation to one another, the first and second sensors each comprising a tube; vibrating the tube comprises vibrating the tubes of the first and second sensors; communicating the wellbore formation fluid is into the vibrating tube comprises: communicating the wellbore formation fluid into the vibrating tube of the first sensor; and communicating the wellbore formation fluid into the vibrating tube of the second sensor; acquiring vibrational measurements of the wellbore formation fluid comprises: acquiring inlet temperature and pressure measurements of the wellbore fluid entering the first sensor; acquiring a first gas density measurement of the wellbore fluid as the wellbore fluid travels through the vibrating tube of the first sensor; acquiring a second gas density measurement of the wellbore fluid as the wellbore fluid travels through the vibrating tube of the second sensor; and acquiring outlet temperature and pressure measurements of the wellbore formation fluid exiting the second sensor; and determining the gas molecular weight of the wellbore formation fluid is achieved using a differentiation of the first and second gas density measurements.

20. A method as defined in any of paragraphs 12-19, wherein: the sensing module comprises a first and second sensor arranged in parallel configuration with relation to one another, the first and second sensors each comprising a tube; vibrating the tube comprises vibrating the tubes of the first and second sensors; communicating the wellbore formation fluid into the vibrating tube comprises: communicating the wellbore fluid into the vibrating tube of the first sensor; and communicating the wellbore formation fluid into the vibrating tube of the second sensor; acquiring vibrational measurements of the wellbore formation fluid comprises: acquiring inlet temperature and pressure measurements of the wellbore formation fluid entering the first sensor; acquiring inlet temperature and pressure measurements of the wellbore formation fluid entering the second sensor; acquiring a first gas density measurement of the wellbore formation fluid as the wellbore formation fluid flows through the vibrating tube of the first sensor; acquiring a second gas density measurement of the wellbore formation fluid as the wellbore fluid flows through the vibrating tube of the second sensor; acquiring outlet temperature and pressure measurements of the wellbore fluid exiting the first sensor; and acquiring outlet temperature and pressure measurements of the wellbore fluid exiting the second sensor; and determining the gas molecular weight of the wellbore formation fluid is achieved using a differentiation of the first and second gas density measurements.

21. A method as defined in any of paragraphs 12-20, wherein the sensing module is deployed into a wellbore.

22. A method as defined in any of paragraphs 12-21, wherein communicating the wellbore formation fluid into the vibrating tube comprises utilizing a coalesce filter to remove particles from the wellbore formation fluid before communicating the wellbore formation fluid into the vibrating tube.

23. A method as defined in any of paragraphs 12-22, communicating the wellbore formation fluid into the vibrating tube comprises utilizing a low-density PTFE or high-density polyethylene filter to separate gas/liquid phases of the wellbore formation fluid before communicating the wellbore formation fluid into the vibrating tube.

24. A sensing module to determine gas molecular weight of wellbore formation fluid, the sensing module comprising: a first sensor comprising a vibrating tube through which wellbore formation fluid may flow; and a vibrational excitation mechanism positioned on the tube; and a second sensor comprising a vibrating tube through which wellbore fluid may flow; and a vibrational excitation mechanism positioned on the tube.

25. A sensing module as defined in paragraph 24, wherein the first and second sensors each comprise a hollow tube body having first and second ends; a venturi inlet positioned at the first end; and a venturi outlet positioned at the second end, wherein the vibrating tube is coupled between the venturi inlet and outlet.

26. A sensing module as defined in paragraphs 24 or 25, wherein the hollow tube body comprises a heating element.

27. A sensing module as defined in any of paragraphs 24-26, further comprising: a first temperature sensor embedded within the heating element; and a second temperature sensor positioned inside the hollow tube body.

28. A sensing module as defined in any of paragraphs 24-27, wherein the second temperature sensor comprises part of a temperature control loop feedback mechanism.

29. A sensing module as defined in any of paragraphs 24-28, further comprising processing circuitry operationally coupled to the vibrational excitation mechanism to thereby communicate electrical signals therebetween.

30. A sensing module as defined in any of paragraphs 24-29, wherein the vibrational excitation mechanism is at least one of a magnetic assembly or coil assembly.

31. A sensing module as defined in any of paragraphs 24-30, wherein the first and second sensors are arranged in series configuration relative to one another.

32. A sensing module as defined in any of paragraphs 24-31, wherein the sensing module further comprises a flow inlet coupled to the venturi inlet of the first sensor; and a flow outlet coupled to the venturi outlet of the second sensor.

33. A sensing module as defined in any of paragraphs 24-32, wherein the first and second sensors are arranged in parallel configuration relative to one another.

34. A sensing module as defined in any of paragraphs 24-33, wherein the sensing module further comprises a flow inlet coupled to the venturi inlets of the first and second sensors; and a flow outlet coupled to the venturi outlets of the first and second sensors.

35. A sensing module as defined in any of paragraphs 24-34, further comprising a coalesce or polymer filter coupled to a flow inlet of the sensing module; and a pressure and flow control mechanism coupled to the flow inlet and a flow outlet of the sensing module.

36. A sensing module as defined in any of paragraphs 24-35, wherein the sensing module forms part of a downhole assembly.

37. A sensing module as defined in any of paragraphs 24-36, wherein the vibrating tubes of the first and second sensors comprises a Ti or Ti-alloy, or a carbon fiber reinforced polymer composite material based high-strength tube.

Although various embodiments and methodologies have been shown and described, the disclosure is not limited to such embodiments and methodologies and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A method to determine averaged gas molecular weight of wellbore formation fluid, the method comprising:
   receiving a wellbore formation fluid into a sensing module having a first and second gas sensor each comprising a tube;
   vibrating the tubes of the first and second gas sensors;
   communicating the wellbore formation fluid into the vibrating tubes of the first and second gas sensors;
   maintaining the first and second gas sensors under an isothermal condition;
   acquiring vibrational measurements of the wellbore fluid flowing through the vibrating tubes of the first and second gas sensors while maintaining the isothermal condition, the vibrational measurements being temperature, pressure and density measurements of the wellbore fluid traveling through the vibrating tubes of the first and second gas sensors; and
   utilizing the vibrational measurements to determine the averaged gas molecular weight of the wellbore fluid.

2. A method as defined in claim 1, wherein vibrating the tubes comprises activating an excitation mechanism positioned on the tubes.

3. A method as defined in claim 1, further comprising utilizing the averaged gas molecular weight to identify the wellbore formation fluid.

4. A method as defined in claim 1, further comprising utilizing the averaged gas molecular weight to predict phase behavior of the wellbore fluid.

5. A method as defined in claim 1, wherein:
   vibrating the tube comprises vibrating the tubes of the first and second sensors;
   communicating the wellbore fluid into the vibrating tube comprises:
      communicating the wellbore formation fluid into the vibrating tube of the first sensor; and
      communicating the wellbore formation fluid into the vibrating tube of the second sensor;
   acquiring vibrational measurements of the wellbore fluid comprises:
      acquiring temperature and pressure measurements of the wellbore fluid traveling through the vibrating tube of the first sensor;
      acquiring a first gas density measurement of the wellbore fluid traveling through the vibrating tube of the first sensor;
      acquiring temperature and pressure measurements of the wellbore fluid traveling through the vibrating tube of the second sensor; and
      acquiring a second gas density measurement of the wellbore fluid traveling through the vibrating tube of the second sensor; and
   determining the gas molecular weight of the wellbore fluid is achieved using a differentiation of the first and second gas density measurements.

6. A method as defined in claim 1, wherein:
the first and second gas sensors are arranged in series configuration with relation to one another;
vibrating the tube comprises vibrating the tubes of the first and second sensors;
communicating the wellbore formation fluid into the vibrating tube comprises:
- communicating the wellbore formation fluid into the vibrating tube of the first sensor; and
- communicating the wellbore formation fluid into the vibrating tube of the second sensor;

acquiring vibrational measurements of the wellbore formation fluid comprises:
- acquiring inlet temperature and pressure measurements of the wellbore fluid entering the first sensor;
- acquiring a first gas density measurement of the wellbore fluid as the wellbore fluid travels through the vibrating tube of the first sensor;
- acquiring a second gas density measurement of the wellbore fluid as the wellbore fluid travels through the vibrating tube of the second sensor; and
- acquiring outlet temperature and pressure measurements of the wellbore formation fluid exiting the second sensor; and determining the gas molecular weight of the wellbore formation fluid is achieved using a differentiation of the first and second gas density measurements.

7. A method as defined in claim 1, wherein:
the first and second sensors are arranged in parallel configuration with relation to one another;
vibrating the tube comprises vibrating the tubes of the first and second sensors;
communicating the wellbore formation fluid into the vibrating tube comprises:
- communicating the wellbore fluid into the vibrating tube of the first sensor; and
- communicating the wellbore formation fluid into the vibrating tube of the second sensor;

acquiring vibrational measurements of the wellbore formation fluid comprises:
- acquiring inlet temperature and pressure measurements of the wellbore formation fluid entering the first sensor;
- acquiring inlet temperature and pressure measurements of the wellbore formation fluid entering the second sensor;
- acquiring a first gas density measurement of the wellbore formation fluid as the wellbore formation fluid flows through the vibrating tube of the first sensor;
- acquiring a second gas density measurement of the wellbore formation fluid as the wellbore fluid flows through the vibrating tube of the second sensor;
- acquiring outlet temperature and pressure measurements of the wellbore fluid exiting the first sensor; and
- acquiring outlet temperature and pressure measurements of the wellbore fluid exiting the second sensor; and determining the gas molecular weight of the wellbore formation fluid is achieved using a differentiation of the first and second gas density measurements.

8. A method as defined in claim 1, wherein the sensing module is deployed into a wellbore.

9. A method as defined in claim 1, wherein communicating the wellbore formation fluid into the vibrating tube comprises utilizing a coalesce filter to remove particles from the wellbore formation fluid before communicating the wellbore formation fluid into the vibrating tube.

10. A method as defined in claim 1, communicating the wellbore formation fluid into the vibrating tube comprises utilizing a low-density PTFE or high-density polyethylene filter to separate gas/liquid phases of the wellbore formation fluid before communicating the wellbore formation fluid into the vibrating tube.

11. A method as defined in claim 1, wherein acquiring the vibrational measurements comprises simultaneously acquiring a gas density measurement, temperature measurement, and pressure measurement of the wellbore fluid.

12. A method as defined in claim 11, further comprising maintaining the sensing module under the isothermal condition with an operation temperature maximum allowed by a downhole logging service tool.

* * * * *